US005896167A

United States Patent [19]

Omae et al.

[11] Patent Number: 5,896,167
[45] Date of Patent: Apr. 20, 1999

[54] APPARATUS FOR PHOTOGRAPHING MOVING BODY

[75] Inventors: Masanori Omae, Toyota; Souichi Ishikawa, Nagoya; Shuichi Sunahara, Nishikamo-gun, all of Japan

[73] Assignee: Toyota Jidosha Kabushiki Kaisha, Toyota, Japan

[21] Appl. No.: 08/911,185

[22] Filed: Aug. 14, 1997

Related U.S. Application Data

[63] Continuation of application No. 08/534,004, Sep. 25, 1995, abandoned.

[30] Foreign Application Priority Data

Oct. 21, 1994 [JP] Japan .................................... 6-257137

[51] Int. Cl.$^6$ ........................................ H04N 7/18

[52] U.S. Cl. .......................... 348/149; 348/143; 348/148

[58] Field of Search .................................... 348/149, 143, 348/148, 159; 340/937, 936, 933, 928; H04N 7/18

[56] References Cited

U.S. PATENT DOCUMENTS

| | | | |
|---|---|---|---|
| 3,641,569 | 2/1972 | Bushnell et al. | 340/936 |
| 5,041,828 | 8/1991 | Loeven . | |
| 5,283,573 | 2/1994 | Takatou et al. . | |
| 5,432,547 | 7/1995 | Toyama | 348/149 |
| 5,554,984 | 9/1996 | Shigenaga et al. | 340/937 |

FOREIGN PATENT DOCUMENTS

| | | |
|---|---|---|
| 0 005 532 A1 | 11/1979 | European Pat. Off. . |
| 0 505 858 A1 | 9/1992 | European Pat. Off. . |
| 0 674 293 A2 | 9/1995 | European Pat. Off. . |
| 3422764 A1 | 1/1986 | Germany . |
| 60-150857 | 10/1985 | Japan . |
| 2-95498 | 7/1990 | Japan . |
| 4-169987 | 6/1992 | Japan . |
| 5-20595 | 1/1993 | Japan . |
| 5-325091 | 12/1993 | Japan . |
| 8-293049 | 11/1996 | Japan . |

OTHER PUBLICATIONS

Patent Abstract of Japan vol. 009, No. 127 (p. 360), May 31, 1985, & JP-A-60-010112 (Nippon Denki KK), Jan. 19, 1985.

Kazuyoshi Asada et al., *Hitachi Review*, (1989), "Hitachi-IP/200 High-Performance Image Processor", p. 201.

*Primary Examiner*—Brian L. Casler
*Assistant Examiner*—Luanne P. Din
*Attorney, Agent, or Firm*—Oliff & Berridge PLC

[57] ABSTRACT

An apparatus for photographing a moving body. A video memory including a plurality of frame memories is used in order to store frame images obtained by a plurality of photographing operations. The frame images obtained by photographing are sequentially stored in any of frame memories. Any of a plurality of frame memories is selected in accordance with a detection of a front edge or a rear edge of a vehicle, and a frame image in a selected frame memory is used. A speed of a vehicle is used for this selection. In another case, apparatuses for photographing, such as TV cameras or storage devices such as video memories are provided in a plurality of systems, and a frame relating to either of the systems is selected in accordance with the speed. The high speed processing is enabled without image processings such as clipping of characters on a license plate.

19 Claims, 16 Drawing Sheets

APPARATUS FOR PHOTOGRAPHING MOVING BODY

This is a Continuation of application Ser. No. 08/534,004 filed Sep. 25, 1995 now abandoned.

BACKGROUND OF THE INVENTION

1. Field of the Invention

The present invention relates to an apparatus for photographing a moving body such as a vehicle. More particularly, the present invention relates to photographing a character sign provided on a moving body, such as a license plate of a vehicle, a shape of a moving body and a driver of a moving body.

2. Description of the Prior Art

An apparatus for photographing a license plate of a vehicle has been developed for the purpose of measuring a time taken to drive between or among a plurality of spots or monitoring vehicles breaking a speed limit, etc. An apparatus disclosed in Japanese Patent Laid-Open Publication No. Hei 5-325091 supports at least two cameras above a road using upper arms of installed poles. These cameras are situated on the downstream of an approaching vehicle in the direction of traffic flow. In addition, one of these cameras detects the approaching vehicle while the other takes a picture of a license plate of the approaching vehicle. Capture zones of the detection camera and the enforcement camera are so determined that the capture zone of the detection camera is positioned further upstream than that of the enforcement camera. When the entering of the vehicle driving on a road into the capture zone of the detection camera is detected on the basis of a result of the photographing by the detection camera, the enforcement camera carries out the photographing operation. A picture of a license plate of the approached vehicle can be consequently taken. It should be noted that the detection camera in this apparatus is just an example of a vehicle detector.

Since a response delay is generated in every kind of vehicle detector, a vehicle moves to some extent during this response delay. Here, the enforcement camera has a certain angle of visibility (the capture zone). Therefore, if the moving distance of a vehicle within a time of response delay by the vehicle detector is short enough, namely, as long as the position of the vehicle after the movement response delay is still within the capture zone of the enforcement camera, a picture of the license plate of the vehicle can be taken.

The moving distance of the vehicle during the response delay of the vehicle detector is determined by a speed of the vehicle. If the vehicle moves outside the capture zone of the enforcement camera during a time period (=a time of the response delay of the vehicle detector) from the actual approach of the vehicle until the approach of the vehicle is detected by the vehicle detector, a picture of the license plate can not be taken, as shown in FIG. 18. In FIG. 18, the capture zone of the enforcement camera extends from a position L1 to a position V along the direction of the vehicle's movement, and a vehicle speed at which a picture of the license plate can be barely taken, i.e., a vehicle speed at which the vehicle having passed the position L1 takes a time equal to a response delay time of the vehicle detector to arrive at the position V, is represented as S. That is, a picture of the license plate of the vehicle whose speed exceeds S can not be taken by the apparatus disclosed in Japanese Patent Laid-Open Publication No. Hei 5-325091.

SUMMARY OF THE INVENTION

Therefore a first object of the present invention is to reliably enable a moving body such as a vehicle driving at a high speed to be photographed. A second object of the present invention is to assuredly enable a moving body driving at a low speed to be photographed as well as to attain the first object. A third object of the present invention is to enable a frame including a character sign to be specified from photographs without performing various image processing such as processing for clipping a character sign such as a license plate from the photographs in order to obviate a high speed processor or a large capacity memory and to reduce the implementation cost. A fourth object of the present invention is to securely enable a license plate and other objects to be detected by reducing inconveniences caused due to the fact that pictures are taken outdoors, e.g., variations in illuminance, the existence of buildings, differences between the front-light and the back-light and shadows of vehicles.

A first aspect of the present invention provides an apparatus for photographing a moving body, comprising: photographing means for repeatedly photographing a capture zone, said capture zone being provided on the downstream side in the direction of the movement of said moving body as viewed from a detection position; memory means, which has a plurality of memory areas capable of storing images obtained by multiple photographing operations for sequentially storing the images obtained by repetition of photographing; time detecting means for detecting a time at which said moving body passes said detection position; speed detecting means for detecting a speed at which said moving body passes said detection position; and image selecting means for selecting at least one from a plurality of stored images on the basis of said time and said speed.

According to the first aspect of the present invention, a predetermined capture zone is repeatedly photographed. Images obtained by the photographing are sequentially stored. When the moving body passes a predetermined detection position, the time at which the vehicle passes and the speed of the vehicle are detected. At least one image, e.g., an image including a license plate or a shape of the moving body passing through the capture zone is selected from a plurality of stored images on the basis of the detected time and speed. In this aspect, it is therefore unnecessary to perform image processing such as the clipping of characters or graphics which tends to be affected by the photographing environment with respect to the images obtained by these takes, and necessary images can be securely and rapidly obtained, thereby realizing an apparatus with its processing burdens reduced at a low cost. Further, a number of photographing means can be integrated. The detection position may be provided within a capture zone or at an end portion of the capture zone along a moving direction of a moving body.

In addition, it is preferable to store an image obtained from the most recent take in a memory area storing the earliest taken image among the plurality of memory areas. As a result, the memory capacity of the memory means can be small even if it stores a plurality of images.

As a photographing means, a television camera can be used. The television camera is so provided as to be directed towards the capture zone. Since a video signal output from the television camera includes a synchronous signal which is synchronized with the photographing timing, it is possible to execute or control processing for alternately switching a memory area to which the video signal is stored among the plurality of memory areas, processing for subjecting a video signal obtained by photographing to A/D conversion or processing for subjecting a stored video signal to D/A conversion by using the synchronous signal extracted from the video signal.

The second aspect of the present invention provides an apparatus for photographing a moving body, comprising: time detecting means for detecting a time at which said moving body passes a detection position; speed detecting means for detecting a speed with which said moving body passes said detection position; a plurality of photographing means for photographing in a corresponding capture zone among a plurality of capture zones whose boundaries are continuous or which partially overlap one another, a plurality of said capture zones being provided on the downstream side of said detection position in the direction of movement of said moving body; and picture selecting means for selecting at least one image from a plurality of pictures obtained by said plurality of photographing means on the basis of said time and said speed.

According to the second aspect of the present invention, a plurality of capture zones are set. These capture zones are provided on the downstream side of the detection position in the direction of movement of the moving body so that they become continuous or partially overlap one another. A plurality of photographing means are also provided in correspondence with these capture zones, and the respective capture zones are photographed by the photographing means. When selecting a necessary picture from a plurality of images obtained by the plurality of photographing means, detection results of the time and speed at which the moving body passes a predetermined detection position are used. The same advantages as those of the first aspect are thus produced in this aspect. Compared with the first aspect, the number of photographing means is large but the storage capacity is small.

In the second aspect, a plurality of photographing means, e.g., a plurality of television cameras, are provided in accordance with the fact that a plurality of capture zones exist. Further, the provision of the memory means corresponding with the respective photographing means enables images obtained by the corresponding photographing means to be stored in the respective memory means. In such a case, various processing, e.g., processing for subjecting an image video obtained by the photographing to A/D conversion or processing for subjecting a stored video signal to D/A conversion are controlled or executed in accordance with a signal supplied from an external device.

In either aspect, a loop coil can be used as a time detecting means. The loop coil has a function such that its inductance varies when a magnetic mass passes in the vicinity thereof. The passing timing of the moving body can therefore be apparent by providing the loop coil at the detection position and detecting variations in its inductance in the form of a voltage or a phase. In addition, since the varying speed of the inductance of the loop coil depends on a speed of the moving body, the loop coil can be used as the speed detecting means. Therefore, a single loop coil may be employed as the time detecting means and the speed detecting means.

BRIEF DESCRIPTION OF THE DRAWINGS

The novel features believed characteristic of the invention are set forth in the appended claims. The Invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

Figure 18:
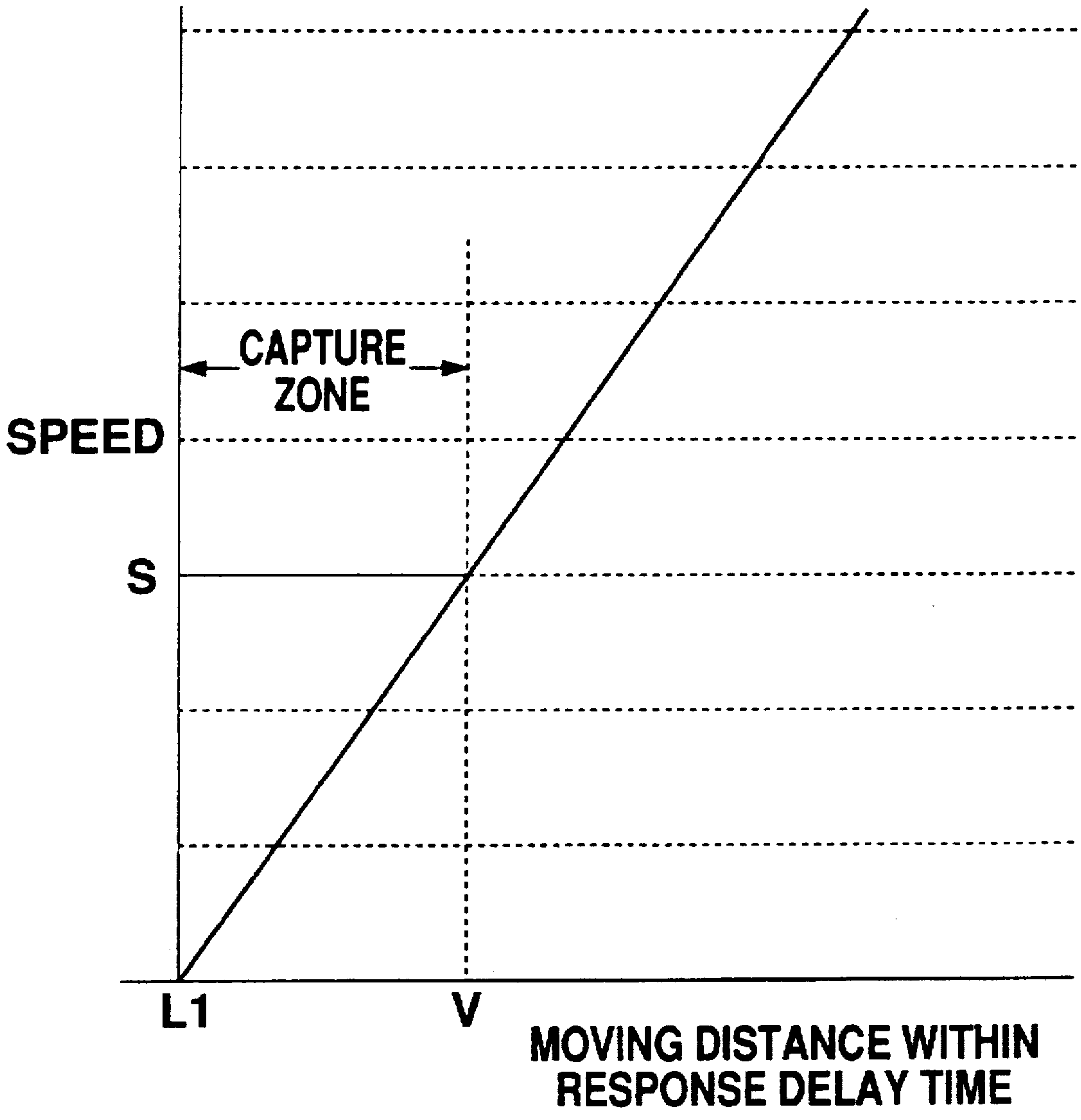
Fig. 18 PRIOR ART
FIG. 18 is a view showing a capture zone in the prior art.

Preferred embodiments according to the present invention will now be described hereinbelow with reference to the drawings. The same reference numerals are given to like or corresponding structures as in the conventional example shown in FIG. 18 or reference examples in FIGS. 1 to 3 which will be described later, and so repeated explanation is omitted.

a) Reference Examples

Firstly, a description will be given as to reference examples before embodiments in order to facilitate the explanation of the respective embodiments according to the present invention.

Figure 1:
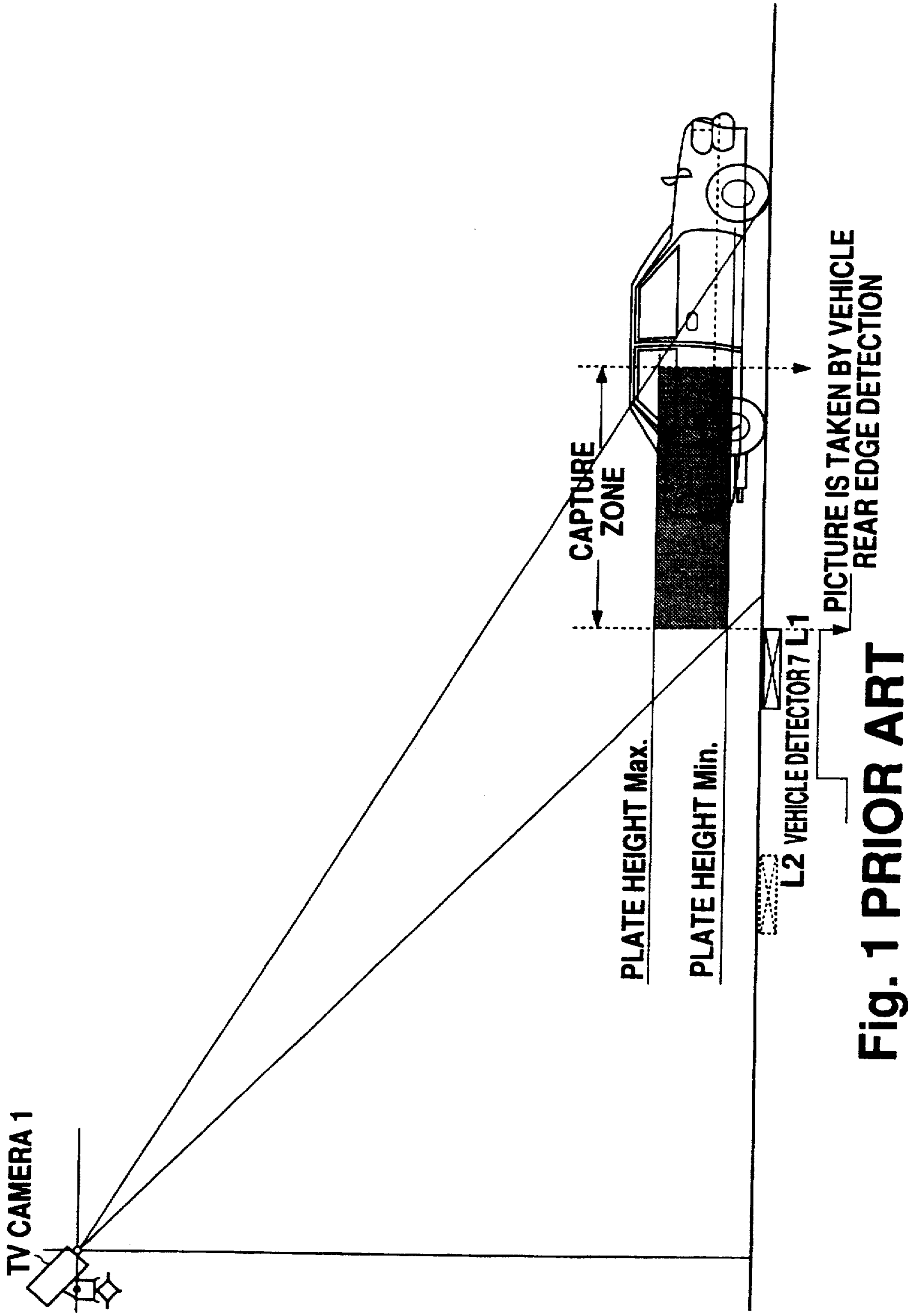
Fig. 1 PRIOR ART
FIG. 1 is a view showing a system for photographing vehicles according to a first reference example of the present invention.
Figure 2:
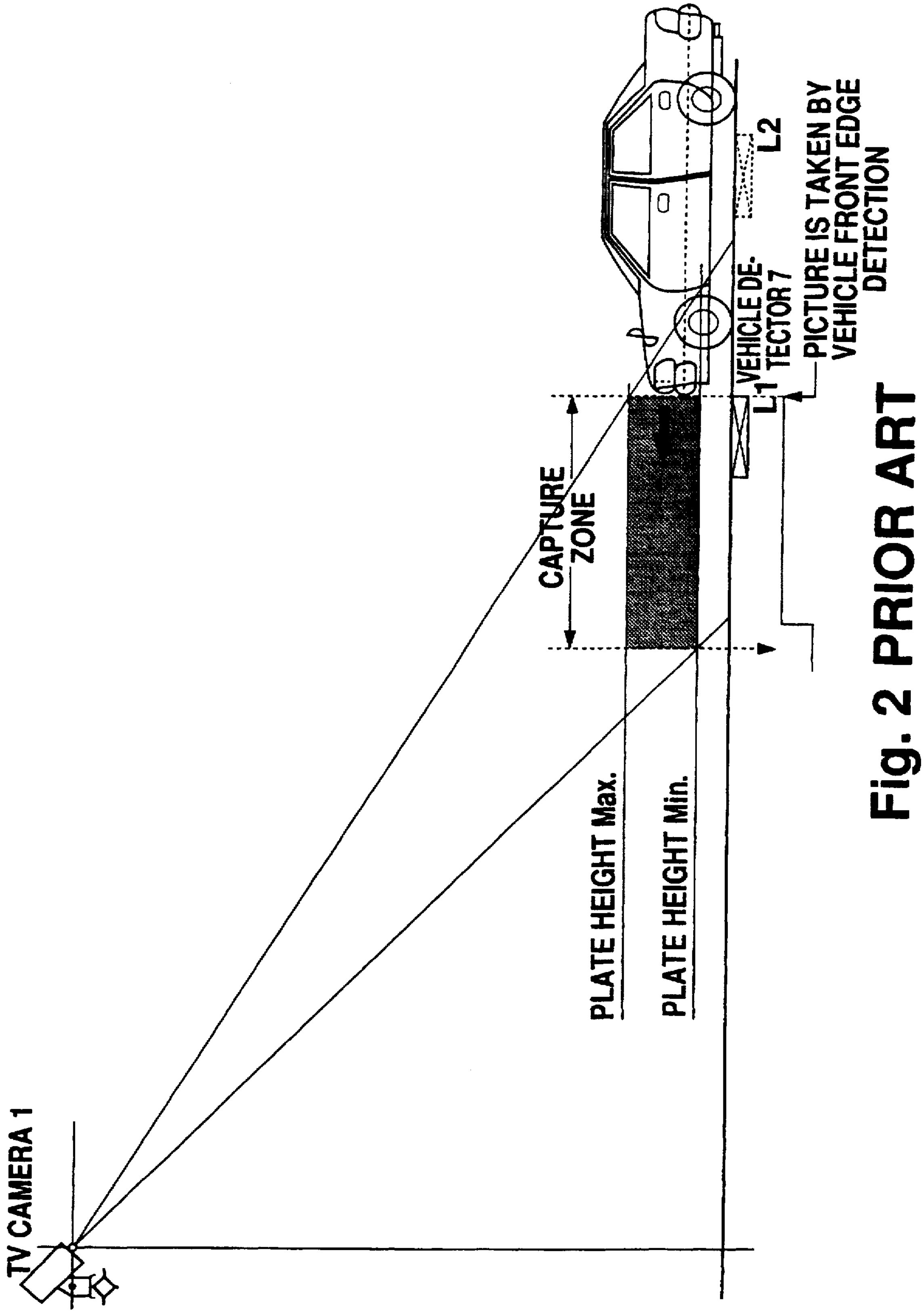
Fig. 2 PRIOR ART
FIG. 2 is a view showing a system for photographing vehicles according to a second reference example of the present invention.
Figure 3:
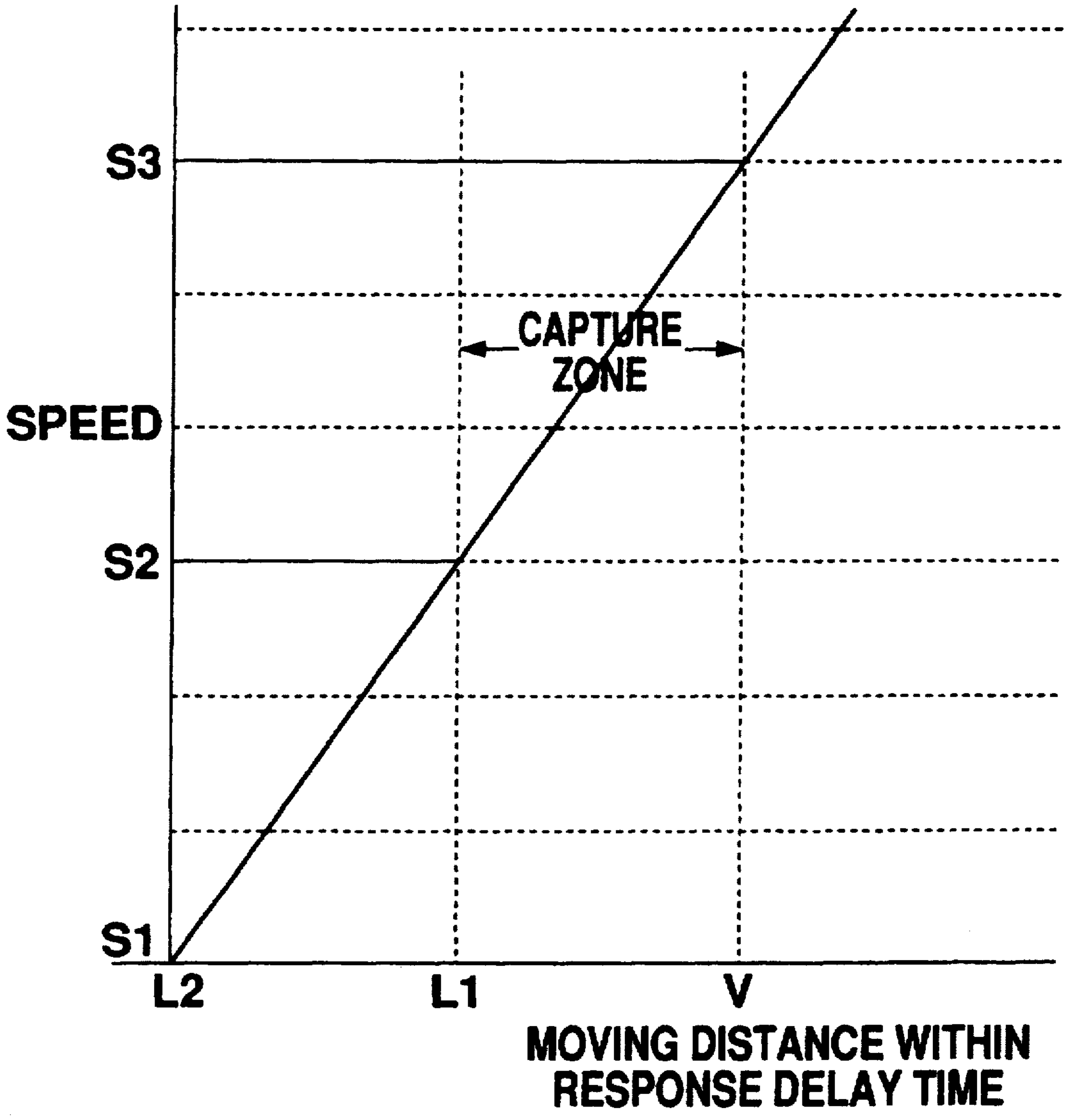
Fig. 3 PRIOR ART
FIG. 3 is a view showing a capture zone in the first and second reference examples.

As a license plate photographing apparatus for, e.g., measuring a time taken to drive between or among a plurality of spots or monitoring vehicles breaking a speed limit, there are apparatuses such as those shown in FIGS. 1 and 2, besides the apparatus disclosed in Japanese Patent Laid-Open Publication No. Hei 5-325091. In these drawings, a television (TV) camera 1 is provided at a predetermined height above a road and on the other hand a vehicle detector 7 is embedded in the road. The vehicle detector 7 is, for example, a loop coil whose inductance varies in accordance with a metallic mass which passes thereover. The vehicle detector 7 continues to output a signal having a value representing an existence of a vehicle in a period during which a front edge of the vehicle approaches the vehicle detector 7 and the rear edge of the vehicle passes over the same 7.

In the example illustrated in FIG. 1, the TV camera 1 is directed in the downstream direction along a moving direction of the vehicle. An angle of depression or the capture zone of the TV camera 1 is determined so that a picture of a license plate of the vehicle can be taken when the license plate exists within a rectangular area in the drawing which is defined by a vehicle moving direction range: L1 to V and a height direction range: Min to Max. Here, L1 represents a position at which the vehicle detector 7 is embedded; V is positioned to be closer to the downstream side than L1; Min shows a minimum height at which the existence of the license plate is expected; and Max represents a maximum height at which the existence of the license plate is expected. In this illustrated example, if the response delay is negligibly small, an output signal from the vehicle detector 7 is interrupted at the moment the rear edge of the vehicle passes over the vehicle detector 7. If a speed of the vehicle is sufficiently low, the rear license plate of the vehicle can be therefore captured by the TV camera 1 in accordance with the interruption of the output signal from the vehicle detector 7.

Differing from the example shown in FIG. 1, the TV camera 1 is directed towards the upstream side along the vehicle moving direction in an example illustrated in FIG. 2. In this shown example, if the response delay is negligibly small, an output signal from the vehicle detector 7 is generated at the moment the front edge of the vehicle approaches the vehicle detector 7. If a speed of the vehicle is sufficiently low, the front license plate of the vehicle can be captured by the TV camera 1 in accordance with the generation of the output signal from the vehicle detector 7.

However, the vehicle detector 7 actually has a response delay to a certain extent. That is, the output signal from the vehicle detector 7 is interrupted at the moment a response delay time lapses after the rear edge of the vehicle passes over the vehicle detector 7 in the example shown in FIG. 1. Similarly, the output signal from the vehicle detector 7 is generated at the moment a response delay time lapses after the front edge of the vehicle approaches the vehicle detector 7 in the example shown in FIG. 2. Accordingly, when the vehicle detector 7 is provided at the position L1 shown in FIGS. 1 and 2, the problem explained in connection with FIG. 18 occurs, i.e., a problem such that it is impossible to photograph the license plate of the vehicle driving at a high speed.

In order to overcome this problem, as shown by broken lines in FIGS. 1 and 2, the position of the vehicle detector 7 may be shifted to a position L2 provided at the upstream side of the capture zone. That is, the vehicle detector 7 may be provided at a position which is set in accordance with the response delay of the vehicle detector 7. With such an arrangement, even when the vehicle is driving at a relatively high speed (a speed in a range from S2 to S3 in FIG. 3), a picture of the license plate can be taken by the TV camera 1 at any position ranging from the position L1 to the position V. Further, by taking the pictures repeatedly in a predetermined interval of time after the rear edge (FIG. 1) or the front edge (FIG. 2) of the vehicle is detected by the vehicle detector 7 provided at a position L2, the picture of the license plate can be taken even when the vehicle is driving at a relatively low speed by which the vehicle only moves to a position in front of the position L1 within the response delay time of the vehicle detector 7.

It is, however, impossible to take the picture of the vehicle driving at a low speed by only shifting the vehicle detector 7 from the position L1 to the position L2 unless the picture taking is repeated after the detection of the rear or front edge of the vehicle. That is, the repetition of takes is required in order to obtain a wide dynamic range. Since it is not possible to previously know the number of times of photographing to capture the license plate after the repetition is started, image processing such as clipping of characters on the license plate must be carried out by the method disclosed in, e.g., Japanese Patent Laid-Open Publication No. Hei 4-169987 with respect to all the multiple pictures obtained by the repetition of photographing in order to select a picture in which the license plate is captured. Such image processing must be performed in real time, and a large memory capacity is required for storing the pictures and others obtained by the repetition of photographing, thus increasing the implementation cost. In addition, since the pictures of the license plate are taken in an outdoor environment, the image processing is affected by variations in illuminance, the existence of buildings, differences in front- and back-lights and shadows of vehicles, thereby changing the accuracy of the license plate detection.

b) First Embodiment

In the present invention, a method for selecting a necessary frame from taken pictures is improved. With this improvement, the image processing such as the clipping of characters is no longer required, and the constantly-accurate and cost-effective photographing with respect to a moving body can be realized.

Figure 4:
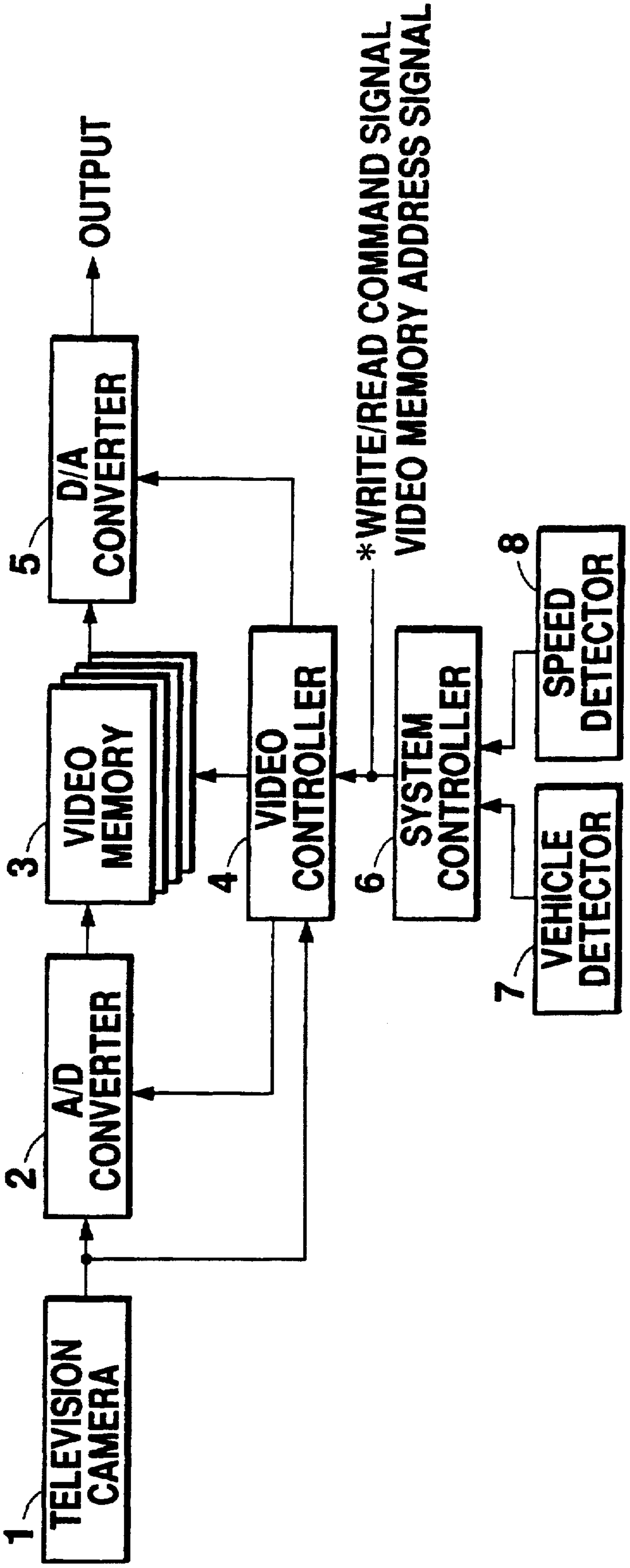
FIG. 4 is a block diagram showing a structure of an apparatus according to a first embodiment of the present invention.

FIG. 4 shows a structure of an apparatus according to a first embodiment of the present invention. The apparatus illustrated in this drawing is constituted by: a TV camera 1; an A/D converter 2; a video memory 3; a video controller 4; a D/A converter 5; a system controller 6; a vehicle detector 7; and a speed detector 8. As will be later described, the TV camera 1 operates, for example, every 1/30 second interval in response to an internal trigger.

Figure 5:
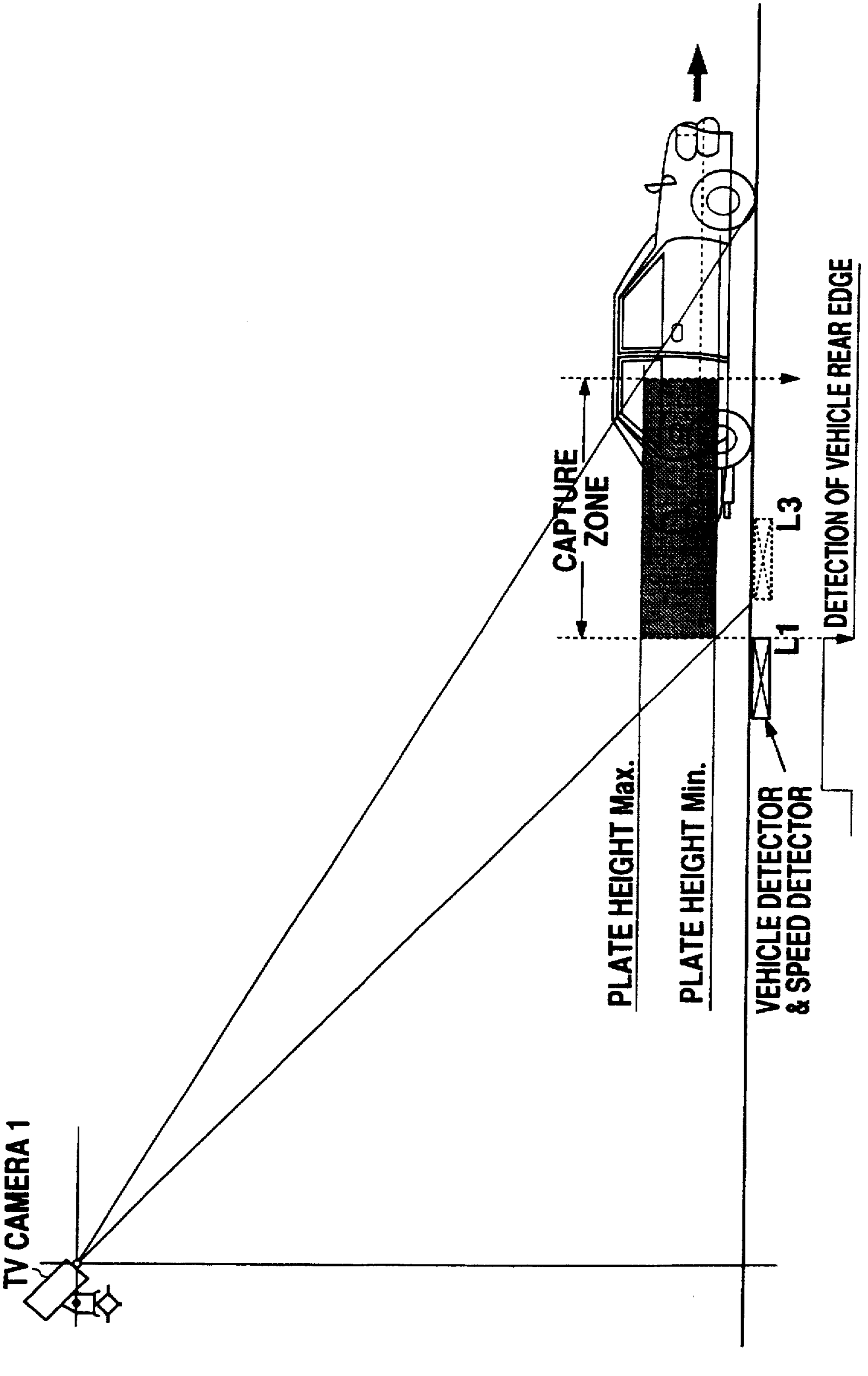
FIG. 5 is a side view showing an arrangement of a television camera and a capture zone in the first embodiment.

Referring to FIG. 5, the TV camera 1 is provided at a height above a road and points downwards at a predetermined angle. The TV camera is provided with a function for clicking the shutter at a high speed of approximately 1/1000 second, in order to take the picture of the vehicle driving on the road without blurring, namely, to obtain static images. The TV camera 1 outputs a taken static image of the vehicle as analog video signals. The A/D converter 2 converts the video signals output from the TV camera 1 into digital data. The video memory 3 stores the digital data obtained by the A/D converter 2 under the control of the video controller 4. The D/A converter 5 converts the digital data stored in the video memory 3 into analog video signals to be output therefrom.

The video controller 4 controls the operations of the A/D converter 2, the video memory 3 and the D/A converter 5. The video controller 4 first extracts a vertical synchronous signal and a horizontal synchronous signal from the video signal output from the TV camera 1. The video controller 4 generates a video memory address for each one pixel on the basis of the thus-extracted respective synchronous signals. The video controller 4 writes the output from the A/D converter 2 to the video memory 3 by using the generated address, and reads the data from the video memory 3 to supply them to the D/A converter 5. The video controller 4 uses the D/A converter 5 to convert the data fed thereto into a video signal.

The system controller 6 detects a position of the rear edge of the passing vehicle (the passing timing of the vehicle) and its speed on the basis of outputs from the vehicle detector 7 and the speed detector 8. The system controller 6 supplies a write command, a read command, a memory address selection signal at the time of reading data and other commands to the video controller 4.

Figure 6:
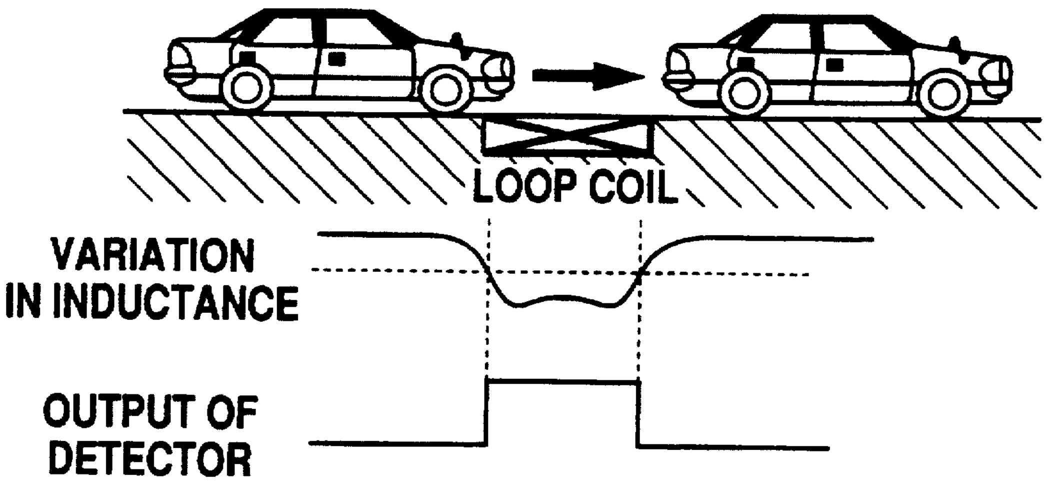
FIG. 6 is a view showing an example of a structure of a vehicle detector.
Figure 7:
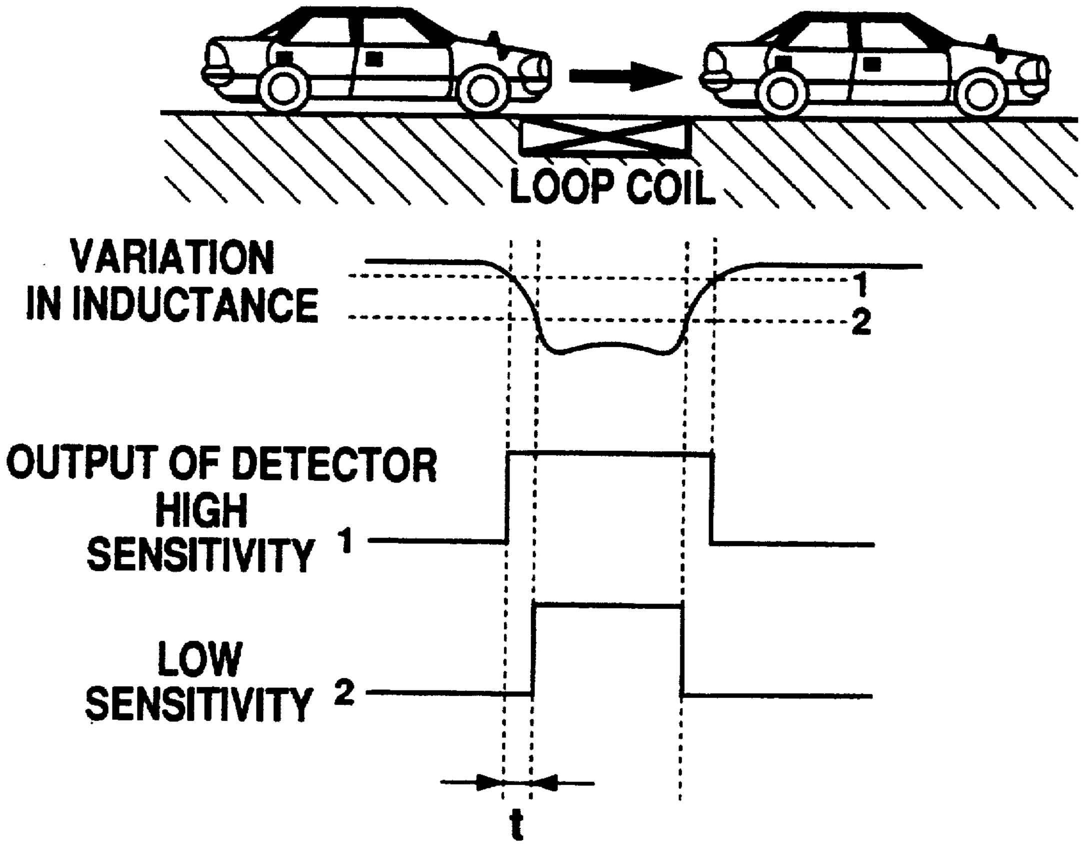
FIG. 7 is a view showing an example of a structure of a speed detector.

As shown in FIG. 5, for example, the vehicle detector 7 and the speed detector 8 may be constituted by a single loop coil embedded at the position L1 provided in front of the capture zone of the TV camera 1. Since the inductance of the loop coil varies when the vehicle passes thereover, a variation in the inductance is detected as an electric signal to be compared with a predetermined threshold value, thereby making it possible to obtain a signal represented as "a detector output" as shown in FIG. 6. The vehicle detector 7 for detecting the vehicle can be constituted on such a principle. Further, the passing speed of the vehicle can be detected as shown in FIG. 7 by comparing the electric signal output from the loop coil with two different threshold values (a high sensitivity threshold value #1 and a low sensitivity threshold value #2). More particularly, it is possible to obtain the passing speed of the vehicle by comparing the electric signal indicating a variation in the inductance with the high sensitivity threshold value #1 and the low sensitivity threshold value #2 and by detecting a time lag t between when the two threshold values are detected. The speed detector 8 for detecting the speed of the vehicle can be configured on the basis of this principle.

Figure 8:
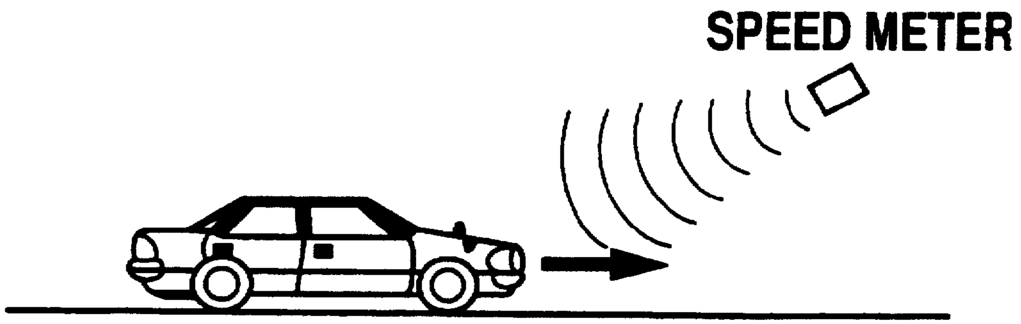
FIG. 8 is a view showing an example of a structure of the combined vehicle-and-speed detector.
Figure 9:
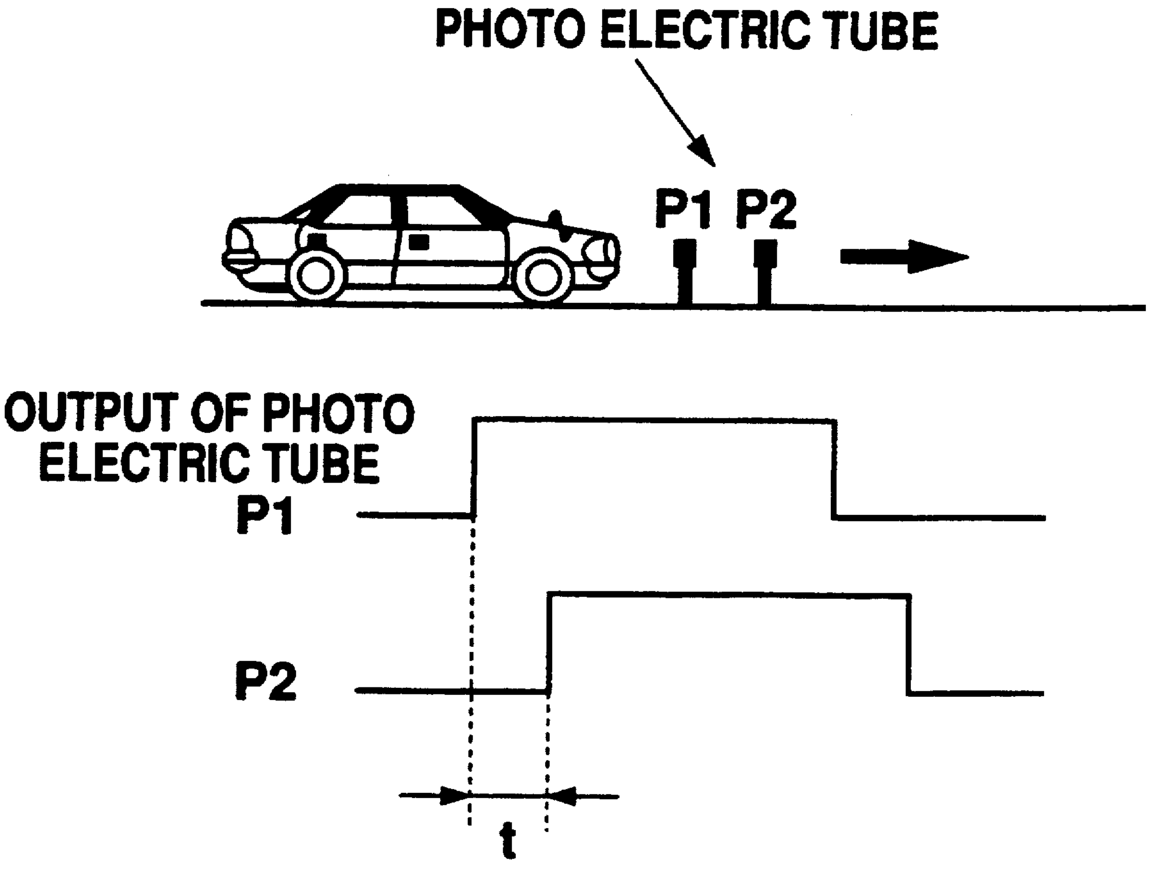
FIG. 9 is a view showing an example of a structure of the combined vehicle-and-speed detector.

The vehicle detector 7 and the speed detector 8 can be constituted as a speedometer having a structure shown in FIG. 8, namely, an ultrasonic or microwave Doppler speedometer using the Doppler effect. The vehicle detector 7 and the speed detector 8 can also be provided with two photoelectric tubes P1 and P2 to be arranged as an apparatus for obtaining a detection time difference t between these photoelectric tubes P1 and P2, as shown in FIG. 9.

Figure 10:
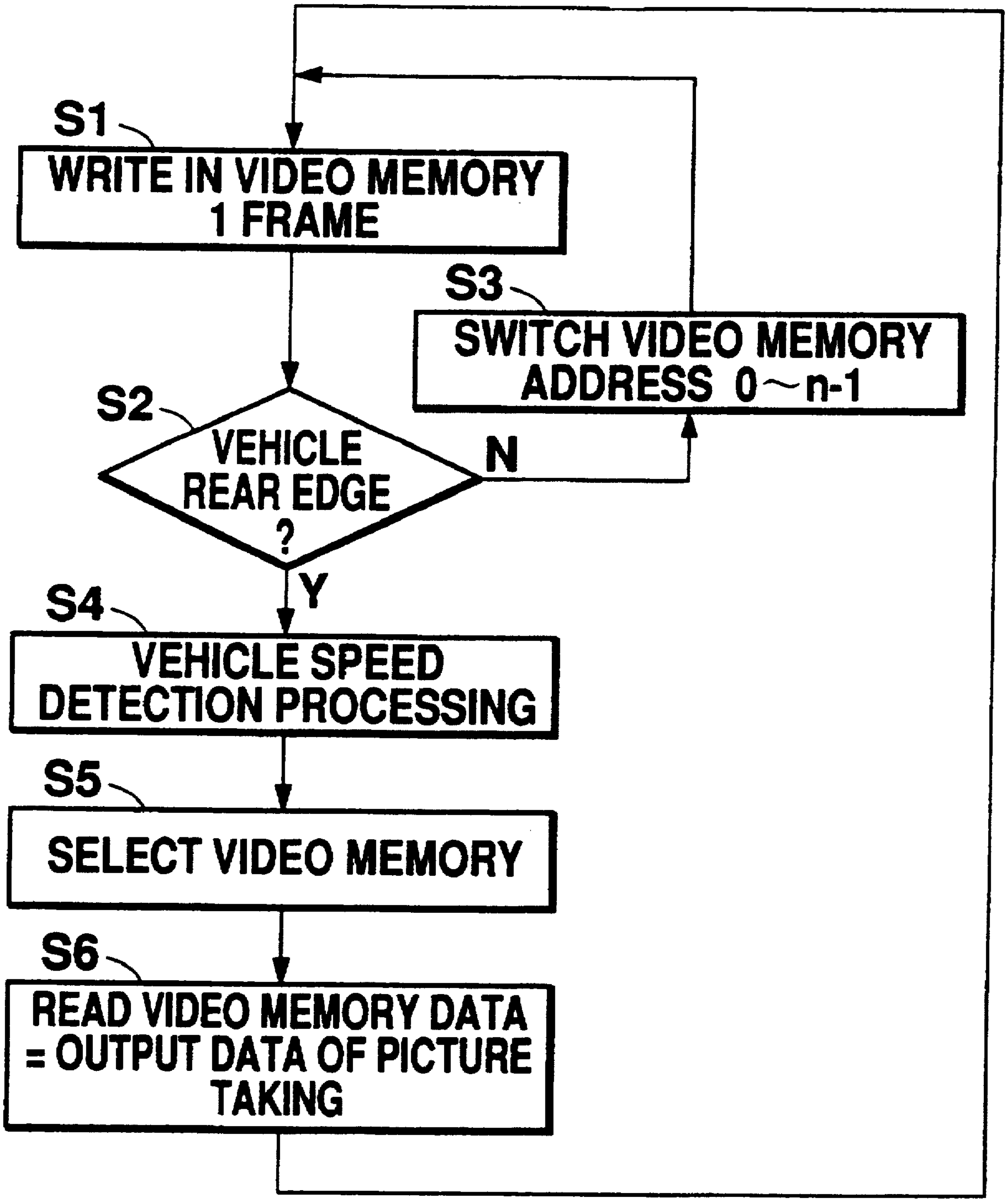
FIG. 10 is a flowchart showing the flow of a control operation in the first embodiment.

FIG. 10 shows the flow of operations of the system controller 6 and the video controller 4 in this embodiment.

Figure 11:
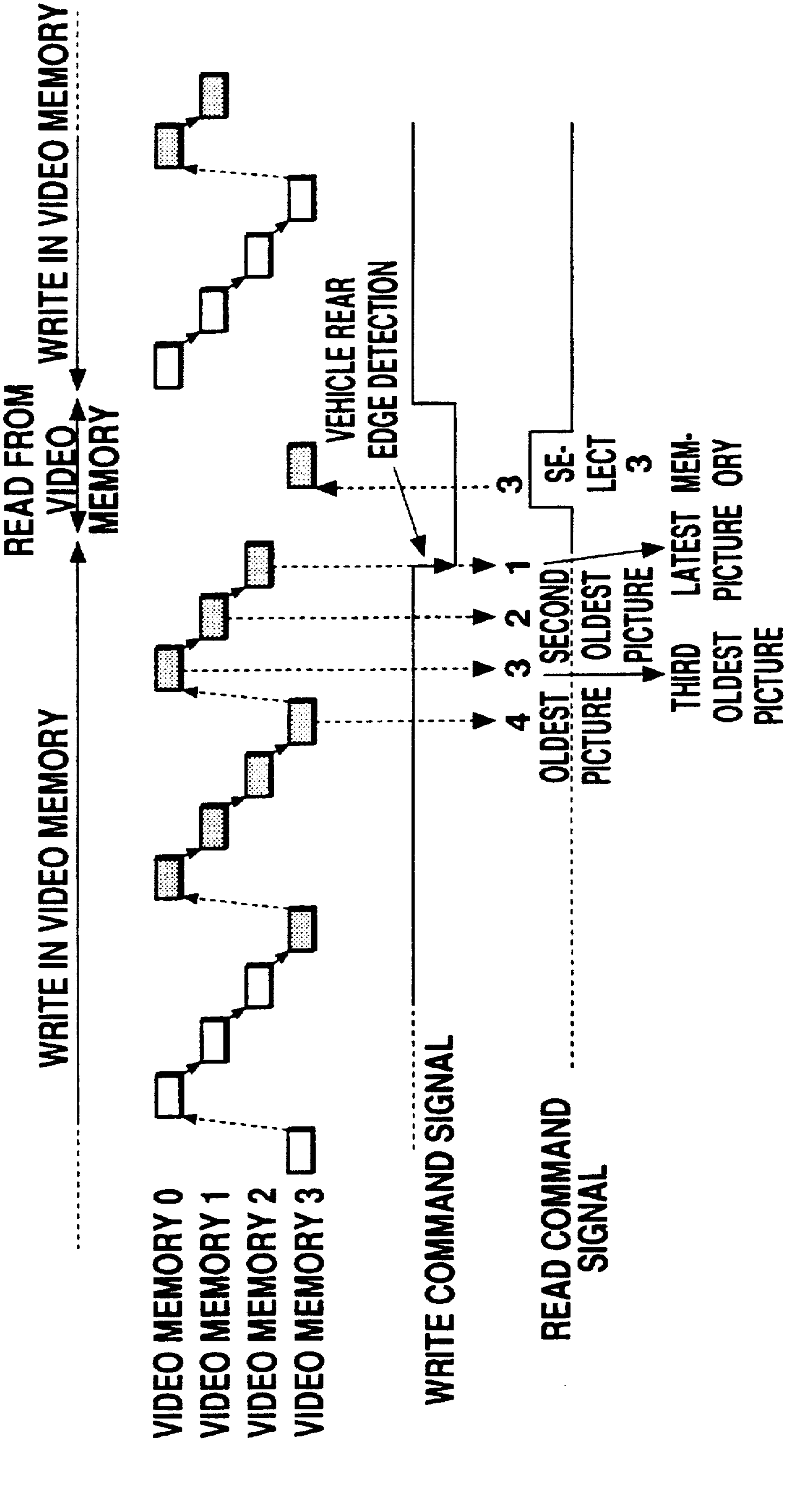
FIG. 11 is a conceptual view showing timing for writing into and reading from memories in the first embodiment.

As shown in this drawing, in the present embodiment, frames taken by the TV camera 1 are sequentially written into the video memory 3 through the A/D converter 2 (S1) while successively changing the video memory addresses in the order from 0 to n−1 (S3) until the rear edge of the passing vehicle is detected (S2). The video memory addresses described here mean addresses for selectively specifying the frame memories which are provided in the video memory 3 in accordance with a number of frames. A video memory address=0 is specified to a first frame memory; a video memory address=1, to a second frame memory; and a video memory address=n−1, to an n−1th frame memory, respectively. When n=4 is assumed as an example, the operation such that: a static image related to a frame obtained at a given time point is written into the fourth frame memory (the video memory address=3); another static image related to a next frame is written into the first frame memory (the video memory address=0); and a static image related to a following frame is written into the second frame memory (the video memory address=1), is carried out in the video memory 3 by repeating the steps S1 to S3 as shown in FIG. 11.

When the rear edge of the vehicle is detected by the vehicle detector 7 at a point in time during which the steps S1 to S3 are repeated (S2), the system controller 6 turns off the write command signal. In response to this operation, the system controller 6 performs the vehicle speed detection processing (S4). That is, the system controller 6 detects the speed of the vehicle on the basis of the output from the speed detector 8. The system controller 6 determines which frame memory the static image must be read from, namely, which frame the static image is related to and must be read from, on the basis of the detected speed (S5). The system controller 6 issues the read command to the video controller 4 by addressing any frame memory in accordance with the thus-obtained video memory address. The video controller 4 reads the static image data from a frame memory having a memory address corresponding to this command among a plurality of frame memories in the video memory 3. The video controller 4 converts the read static image data into the video signal by using the D/A converter 5 (S6). The operation then returns to the step S1.

Figure 12:
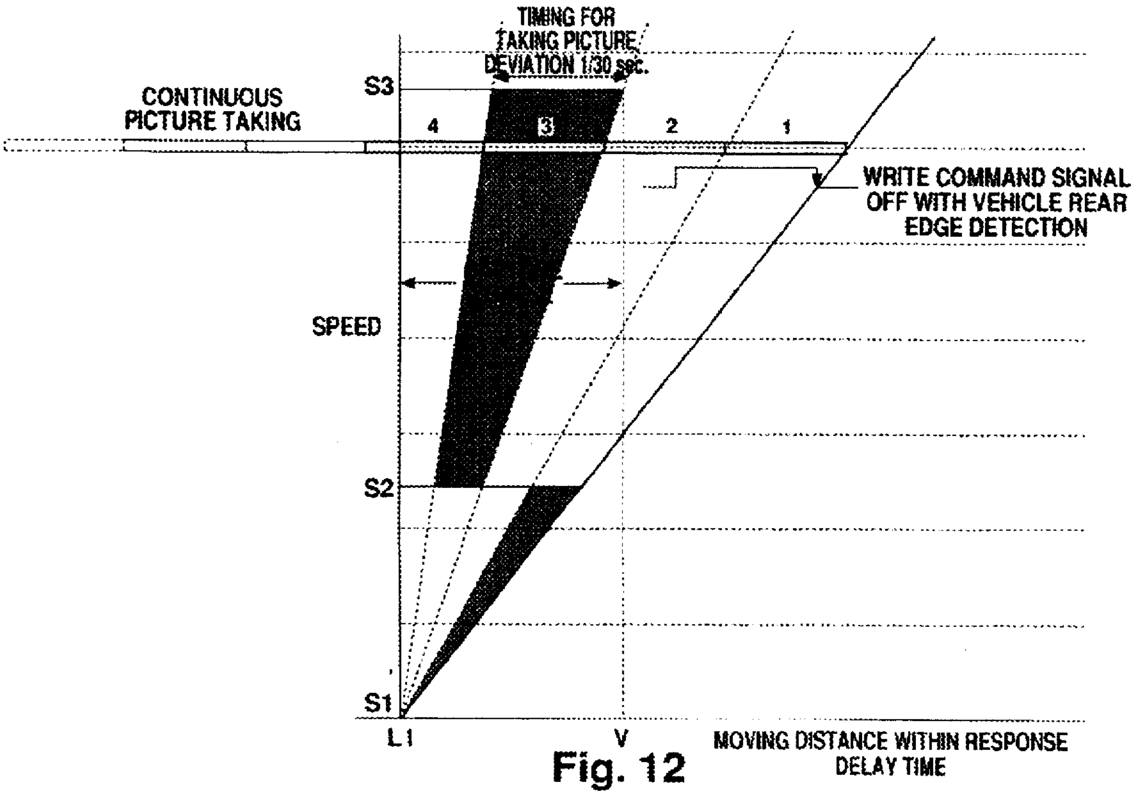
FIG. 12 is a view showing a relationship between a memory to be selected and the speed of a passing vehicle.

FIG. 12 conceptually shows the photographing operation which is realized by these control operations. In this drawing, it is assumed that the number of frame memories is four, similarly to that in FIG. 11. Among the static image data obtained by the continuous photographing operation, a frame stored in the first frame memory is represented as #1; a frame stored in the second frame memory, #2; a frame stored in the third frame memory, #3; and a frame stored in the fourth frame memory, #4, respectively.

As shown in FIG. 5, a zone extending from the position L1 to the position V is the capture zone of the TV camera 1 in this embodiment. The distance which the rear edge of the vehicle moves within the response delay time of the vehicle detector 7 varies in accordance with a vehicle speed as indicated by a solid line in FIG. 12. Thus, in order to capture the license plate of the passing vehicle in the center of the frame, the frame #1 may be selected when the vehicle speed is in a zone extending from S1 to S2 and the frame #3 may be selected when the speed is in a zone extending from S2 to S3, for example. In the previously-mentioned step 5, the video memory address is determined in accordance with such a principle.

According to the present embodiment, processing such as clipping of the license plate therefore becomes unnecessary. Further, the dynamic range can be widened. Since each frame memory of the video memory 3 is alternately used as shown in FIG. 11, the memory capacity can be reduced. Since the clipping of characters is avoided, the deterioration of the detection performance caused by, for example, a difference between the front- and back-lights, is prevented.

Figure 13:
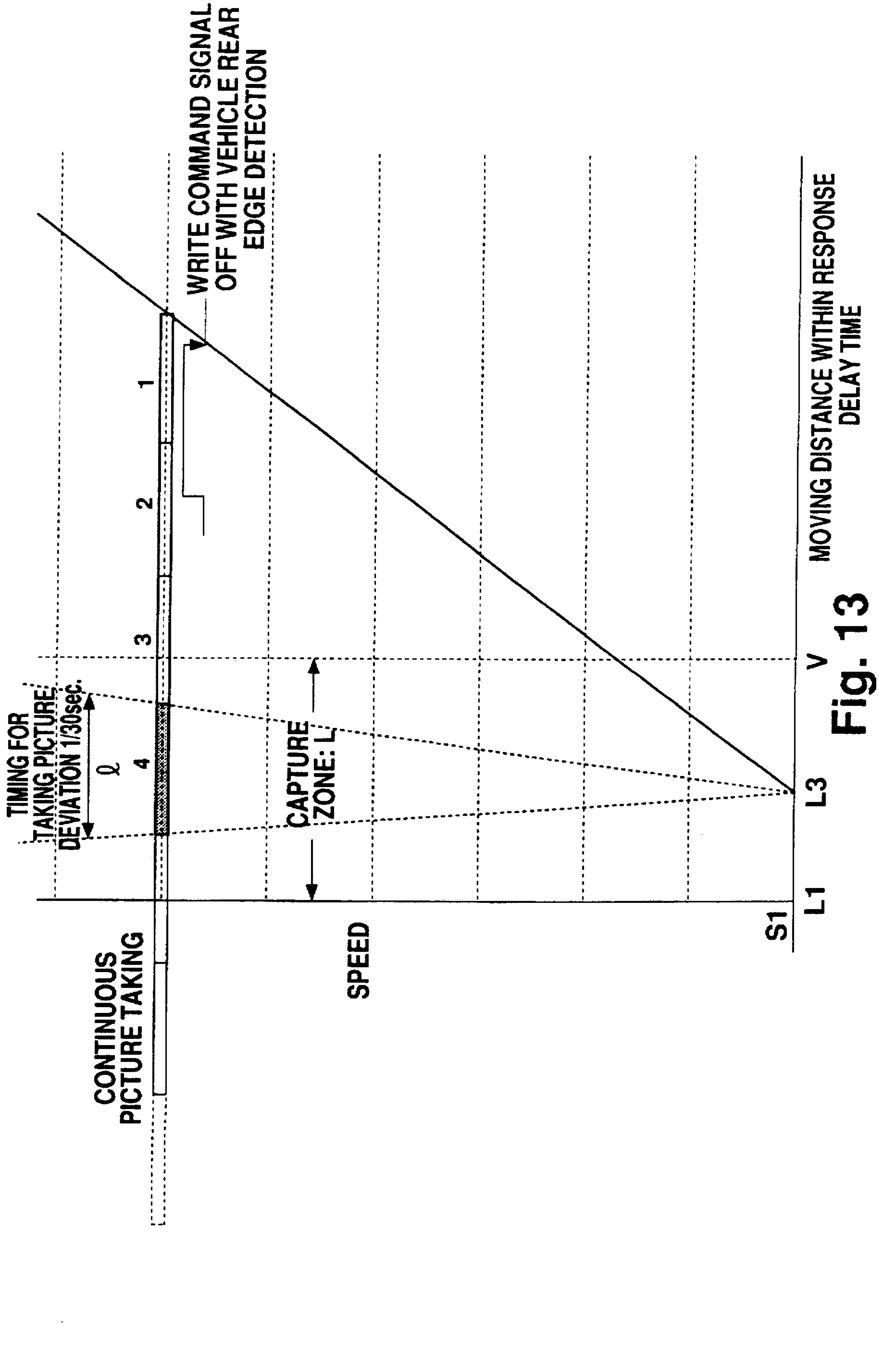
FIG. 13 is a conceptual view showing a relationship between a memory to be selected and the speed of a passing vehicle when the position of the combined vehicle-and-speed detector is moved.

Further, when the vehicle detector 7 and the speed detector 8 (or combined vehicle-and-speed detector) are moved to a position L3 which is provided to be further downstream than L1 and further upstream than V as shown by the broken lines in FIG. 5, the timing for turning the write command off is shifted as shown in FIG. 13. With this shift, it is not necessary to select a frame in accordance with a vehicle speed. In the example of FIG. 13, the memory address #4 related to the same frame may be selected regardless of vehicle speed. However, the speed of the vehicle must not be such a high speed that the distance, for which the vehicle moves in a period (1/30 second) during which the photographing timing of the TV camera 1 deviates from the timing for turning off the write command, exceeds the capture zone L.

c) Second Embodiment

Figure 14:
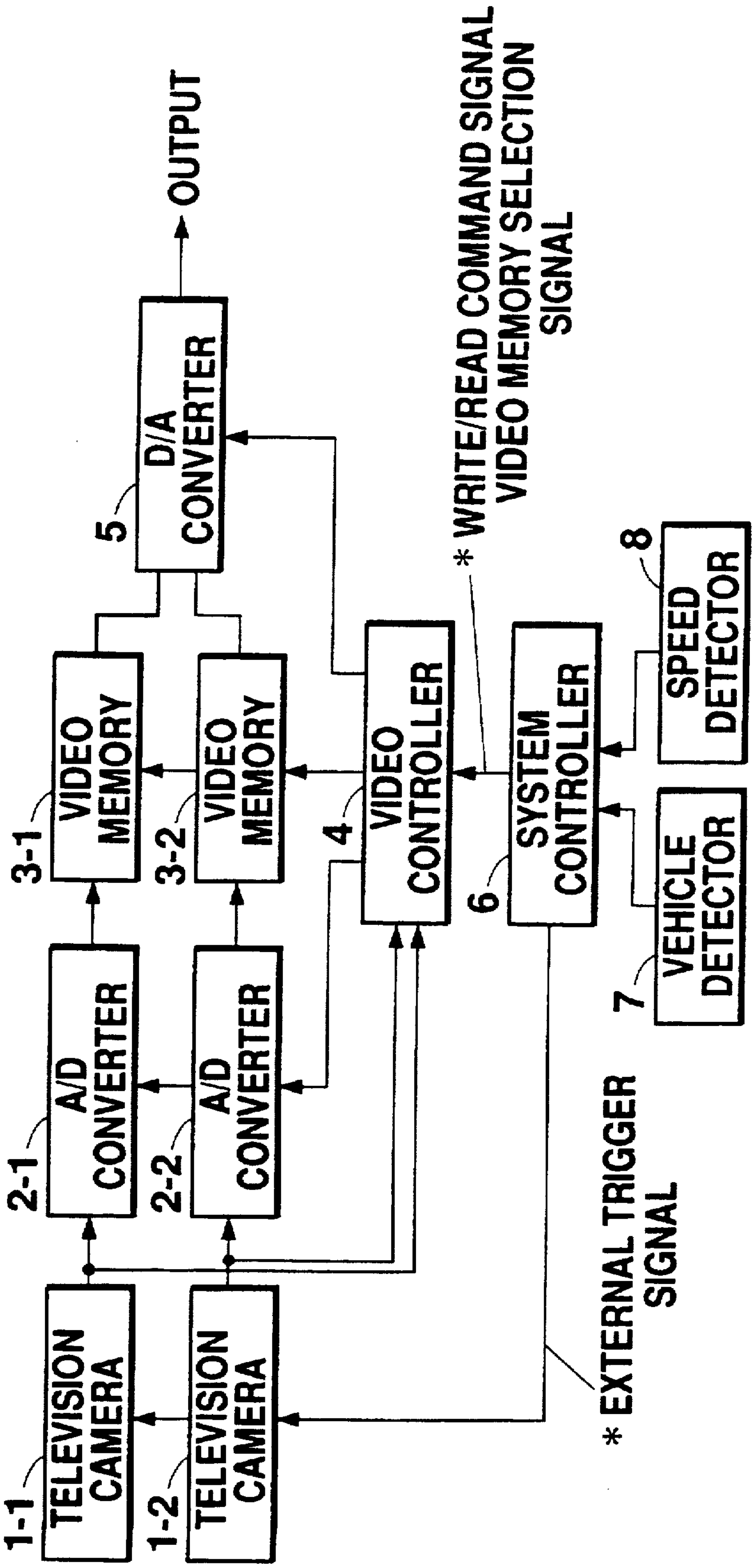
FIG. 14 is a block diagram showing a structure of an apparatus according to a second embodiment of the present invention.

FIG. 14 shows a structure of an apparatus according to a second embodiment of the present invention. In this embodiment, the TV cameras 1, the A/D converters 2 and the video memories 3 are provided in a plurality of systems (two systems in the drawing). A suffix "-1" is given to a reference numeral of each member belonging to a first system, while a suffix "-2" is given to a reference numeral of each member belonging to a second system, respectively. The video controller 4 controls the respective portions in synchronism with the TV cameras 1-1 and 1-2. In addition, this embodiment operates by an external trigger as different from the embodiment shown in FIG. 4.

Figure 15:
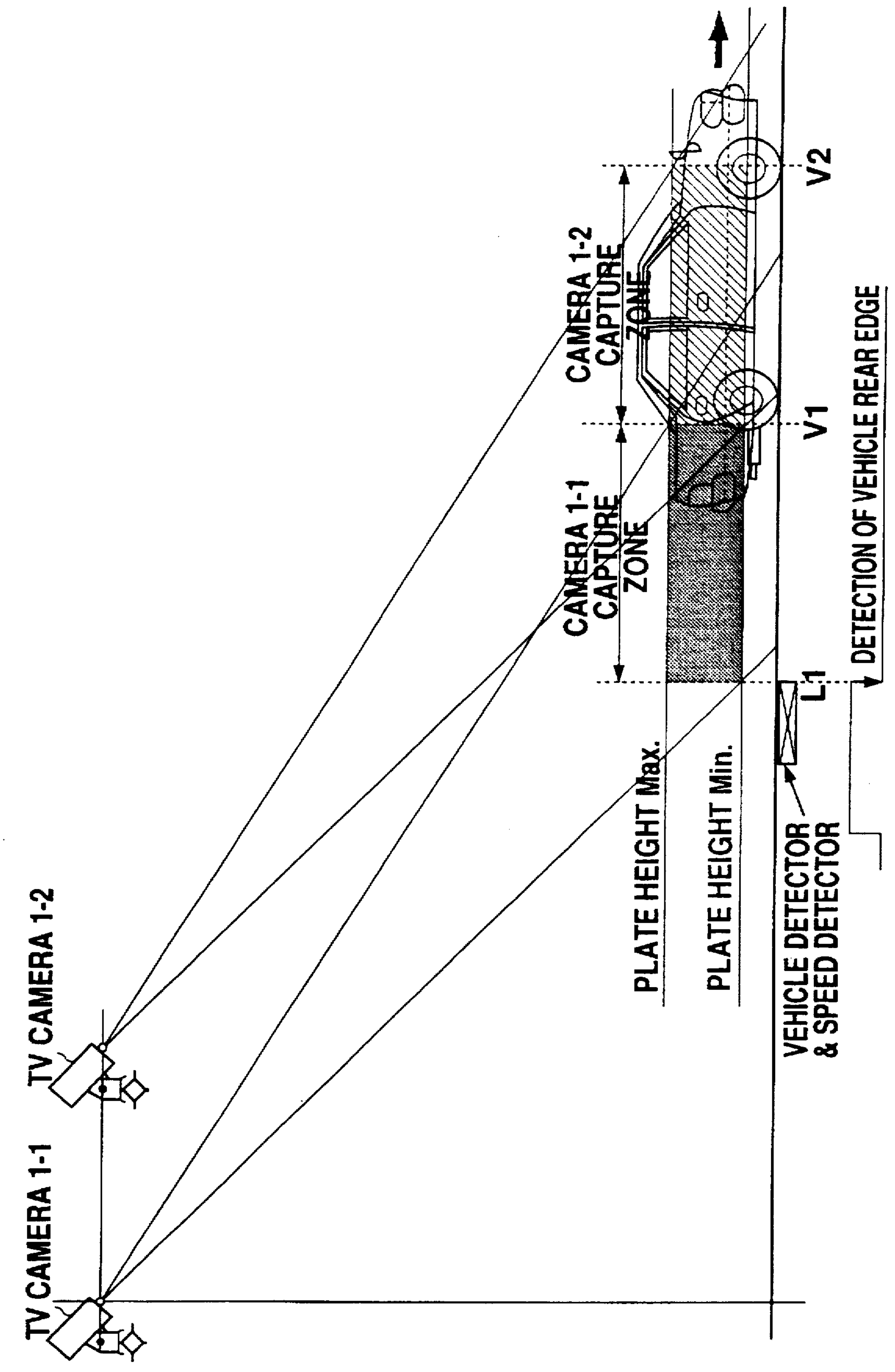
FIG. 15 is a side view showing an arrangement of television cameras and capture zones in the second embodiment.
Figure 16:
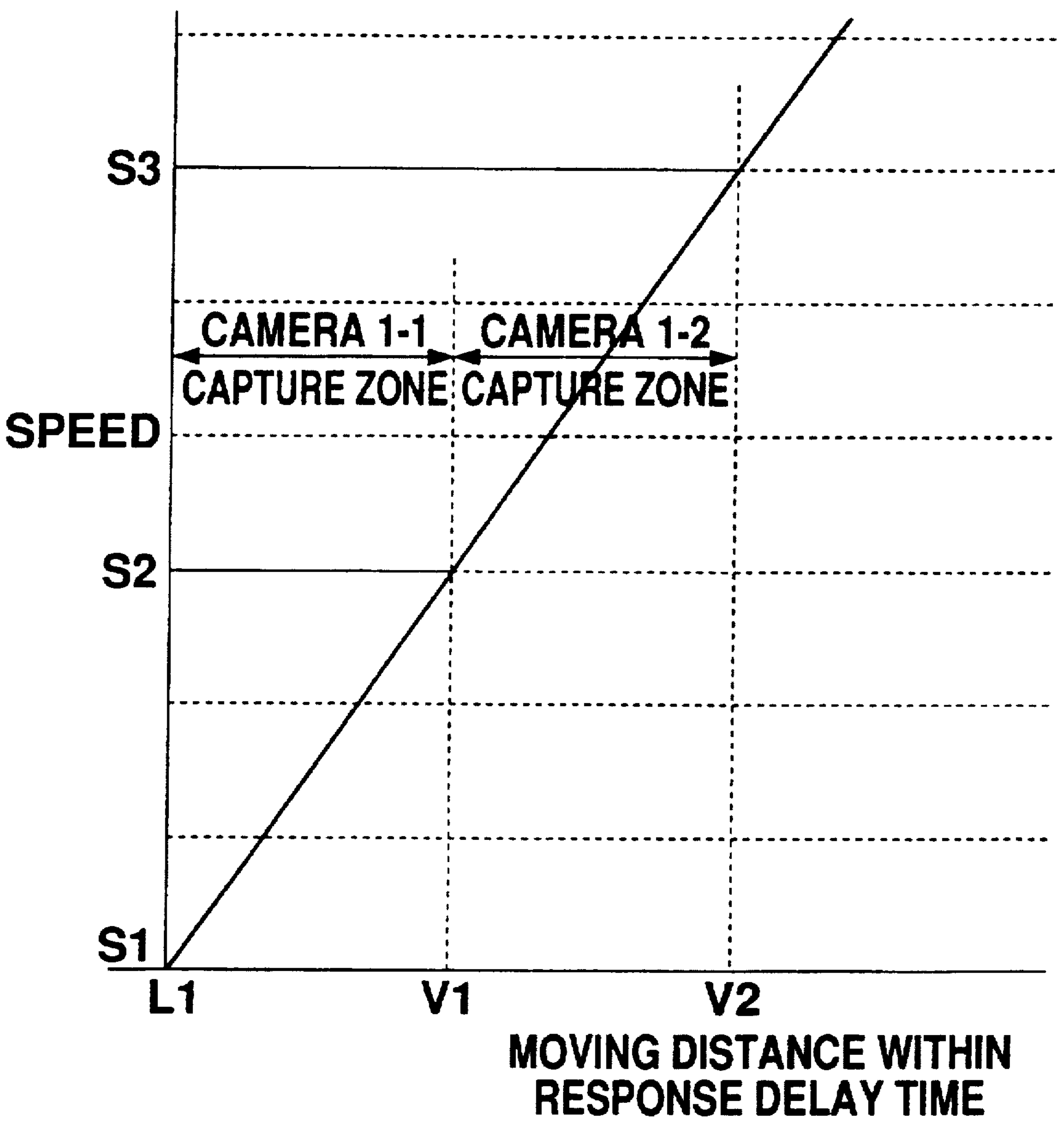
FIG. 16 is a view showing assignments of capture zones of respective cameras in the second embodiment.

FIG. 15 shows an arrangement of the TV cameras 1-1 and 2-2 in this embodiment. As shown in the drawing, the TV cameras 1-1 and 1-2 are provided along the moving direction of the vehicle in an offset manner so that their capture zones become at least continuous or, more preferably, partially overlapping one another. With such an arrangement, a) the TV camera 1-1 can photograph the vehicle driving from the position L1 to the position V1 (namely, the vehicle whose speed is in a range extending from S1 to S2) and, b) the TV camera 1-2 can photograph the vehicle driving from the position V1 to the position V2 (namely, the vehicle whose speed is in a range extending from S2 to S3), within the response delay time of the vehicle detector 7, as shown in FIG. 16.

Figure 17:
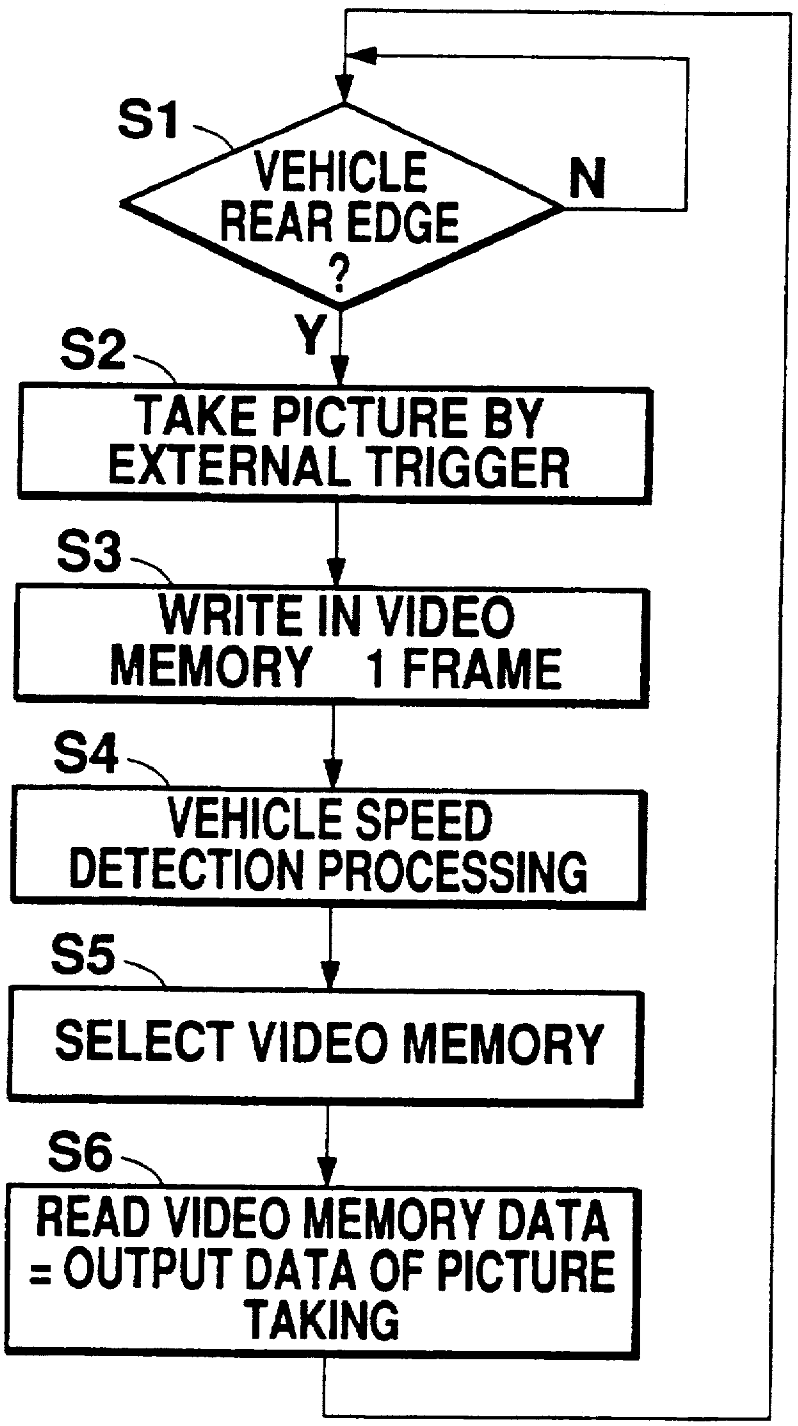
FIG. 17 is a flowchart showing the flow of a control operation in the second embodiment.

FIG. 17 shows the flow of operations of the system controller 6 and the video controller 4 in this embodiment. As shown in the drawing, the system controller 6 first waits until the rear edge of the passing vehicle is detected by the vehicle detector 7 (S1). When the rear edge of the vehicle is detected by the vehicle detector 7, the system controller 6 supplies external trigger signals to the TV cameras 1-1 and 1-2 (S2). The TV cameras 1-1 and 1-2 photograph by clicking the shutters at a high speed of approximately 1/1000 second in response to the external trigger signals. If the speed of the passing vehicle is in a range extending from S1 to S2, the TV camera 1-1 captures pictures of the license plate. If the speed of the passing vehicle is in a range extending from S2 to S3, the TV camera 1-2 captures similar pictures.

The pictures taken by the TV cameras 1-1 and 1-2 are converted into digital data by the A/D converters 2-1 and 2-2 under control of the video controller 4 and the system controller 6. The system controller 6 supplies the write command signal to the video controller 4 for writing the thus-obtained digital data into the corresponding video memories 3-1 and 3-2 (S3). The system controller 6 detects the speed of the passing vehicle on the basis of the output from the speed detector 8 (S4). When the speed is detected, the system controller 6 selects either of the video memory 3-1 or 3-2 in accordance with the detected speed. That is, the system controller 6 selects the video memory 3-1 when the speed is in a range extending from S1 to S2 or the video memory 3-2 when the speed is in a range extending from S2 to S3 (S5). The system controller 6 sends the read command signal to the video controller 4 so that the picture related to the selected video memory is output through the D/A converter 5 (S6).

In this manner, the picture including the license plate can be preferably obtained without performing video processing such as clipping processing of characters on the license plate, similarly to the above-described first embodiment. Further, the dynamic range of the speed related to the detection is also relatively enlarged, and the picture can be taken in a wide range of, e.g., 0–120 km/h.

When the capture zones of the TV cameras 1-1 and 1-2 partially overlap one another, there is a possibility that the picture of the license plate of the vehicle whose speed is close to S2 is taken by both the TV cameras 1-1 and 1-2. Accordingly, it is not required to strictly set the threshold value for judgment to S2 in the step S5. That is, the threshold value may be a value which is close enough to S2 and an allowable error for the threshold value may be large.

When the embodiment shown in FIG. 4 is compared with that shown in FIG. 14, the embodiment in FIG. 4 is more advantageous with regard to cost. In other words, since the number of TV cameras 1 is small, the apparatus according to the embodiment in FIG. 4 can have an inexpensive structure. Furthermore, in the embodiment illustrated in FIG. 14, the illuminated area is enlarged by a non-illustrated illuminator, which leads to such a disadvantage that the apparatus cost or the maintenance cost is increased. This can be understood from the fact that the capture zone of the TV camera 1 must be illuminated in order to clearly photograph the license plate at night or in cloudy weather and the entire capture zone is enlarged because of the use of the two TV cameras in the embodiment in FIG. 14, thereby widening the illuminated area. On the other hand, the memory capacity in the embodiment shown in FIG. 4 must be larger than that in the embodiment illustrated in FIG. 14.

d) Addendum

Although the above explanation has been given as to an example of photographing the license plate, the present invention is not restricted to the license plate. For example, the present invention may be applied to such a use as taking a shape of a vehicle or a figure of a vehicle driver in the form of pictures (if the rights to portraits do not have to be considered).

Further, although the present invention has been described only as an example which photographs by detecting a rear edge of a vehicle in a similar manner to the conventional example shown in FIG. 1, the picture may be taken by detecting a front edge of a vehicle in the same way as the conventional example in FIG. 2. This modification can easily be facilitated for persons skilled in the art by referring to the disclosure of the present application.

What is claimed is:

1. An apparatus for photographing a moving body, comprising:

a camera for repeatedly photographing a capture zone, said capture zone being provided on a downstream side along an advancing direction of said moving body as viewed from a detection position;

a memory, which has a plurality of memory areas being capable of storing images obtained by a plurality of times of photographing operations, for sequentially storing the images obtained by repetition of photographing;

a time detector for detecting a time at which said moving body passes said detection position;

a speed detector for detecting a speed at which said moving body passes said detection position; and an image selector for selecting at least one from a plurality of stored images on the basis of the relationship between said time and said speed, wherein said selected image is an earlier of the plurality of stored images when said vehicle travels at a faster detected speed and said selected image is a later of the plurality of stored images when said vehicle travels at a slower detected speed.

2. An apparatus as set forth in claim 1, further comprising content updater for updating contents of said plurality of memory areas by storing an image obtained by a most recent photographing in a memory area storing an image obtained at an earliest time among a plurality of said memory areas.

3. An apparatus as set forth in claim 1, wherein said camera comprises a television camera directed towards said capture zone, said television camera generating a video signal which includes a synchronous signal synchronized with a timing for photographing and representing a photographed image, and said apparatus further comprises:

an extractor for extracting said synchronous signal from said video signal; and a switch for alternately switching a memory area for storing said video signal among said plurality of memory areas in accordance with extracted synchronous signal.

4. An apparatus as set forth in claim 3, wherein said video signal generated by said television camera is an analog signal, and said apparatus further comprises:

an A/D convertor for converting said video signal generated by said television camera from analog to digital; and a controller for controlling said A/D convertor in accordance with said extracted synchronous signal.

5. An apparatus as set forth in claim 4, further comprising:

a D/A converter means for converting said stored video signal from digital to analog; and a D/A controller for controlling said D/A converting means in accordance with said extracted synchronous signal.

6. An apparatus as set forth in claim 1, wherein said time detector includes a loop coil which is provided at said detection position and whose inductance varies when said moving body passes in the vicinity thereof.

7. An apparatus as set forth in claim 1, wherein said speed detector includes a loop coil which is provided at said detection position and whose inductance varies with a speed corresponding to a speed of said moving body when said moving body passes in the vicinity thereof.

8. An apparatus as set forth in claim 1, further comprising a loop coil which is provided at said detection position and whose inductance varies with a speed corresponding to a speed of said moving body when said moving body passes in the vicinity thereof, said loop coil being shared by said time detector and said speed detector.

9. An apparatus as set forth in claim 1, wherein said detection position is provided within said capture zone.

10. An apparatus as set forth in claim 9, wherein said detection position is provided at an end portion of said capture zone along an advancing direction of said moving body.

11. An apparatus for photographing a moving body, comprising:

a time detector for detecting a time at which said moving body passes a detection position;

a speed detector for detecting a speed at which said moving body passes said detection position;

a plurality of cameras each of which photographs a corresponding capture zone among a plurality of capture zones whose boundaries are continuous or which partially overlap one another, a plurality of said capture zones being provided on a downstream side of said detection position along an advancing direction of said moving body;

a plurality of memory devices which are provided in correspondence with said plurality of cameras and each of which stores an image obtained by a corresponding camera and a picture selector for selecting, on the basis of the relationship between said time and said speed, at least one image from a plurality of pictures obtained by said plurality of cameras, wherein said selected image is an earlier of the plurality of stored images when said vehicle travels at a faster detected speed and said selected image is a later of the plurality of stored images when said vehicle travels at a slower detected speed.

12. An apparatus as set forth in claim 11, wherein said plurality of cameras comprise a plurality of television cameras each of which is directed towards the corresponding capture zone among said plurality of capture zones and generates a video signal representing photographed image.

13. An apparatus as set forth in claim 12, wherein said video signals generated by said plurality of television cameras are analog signals, and said apparatus further comprises:

a camera controller for controlling times at which each of said plurality of television cameras photographs;

a plurality of A/D convertors which are provided in correspondence with said plurality of cameras and said plurality of memory devices and convert said video signals generated by said plurality of television cameras from analog to digital, each of thus obtained digital video signals being supplied to a corresponding memory device; and an A/D controller for controlling said plurality of A/D convertors in accordance with synchronous signals in synchronism with photographing timings.

14. An apparatus as set forth in claim 13, further comprising:

a D/A convertor for converting said video signals stored in said plurality of memory means from digital to analog; and means for controlling said D/A converting means in synchronism with a photographing timing.

15. An apparatus as set forth in claim 11, wherein said time detector includes a loop coil which is provided at said detection position and whose inductance varies when said moving body passes in the vicinity thereof.

16. An apparatus as set forth in claim 11, wherein said speed detector includes loop coils which are provided at detection positions and whose inductances vary with a speed corresponding to a speed of said moving body when said moving body passes in the vicinity thereof.

17. An apparatus as set forth in claim 11, further comprising a loop coil which is provided at said detection position and whose inductance varies with a speed corresponding to a speed of said moving body when said moving body passes in the vicinity thereof, said loop coil being shared by said time detector and said speed detector.

18. An apparatus as set forth in claim 11, wherein said detection position is provided within said capture zone.

19. An apparatus as set forth in claim 11, wherein said detection position is provided at an end portion of said capture zone along an advancing direction of said moving body.

* * * * *